US010989680B2

(12) United States Patent
Reifsnider et al.

(10) Patent No.: US 10,989,680 B2
(45) Date of Patent: Apr. 27, 2021

(54) SYSTEMS AND METHODS FOR ASSESSING THE QUALITY OF ADHESIVE BONDS

(71) Applicant: Board of Regents, The University of Texas System, Austin, TX (US)

(72) Inventors: Kenneth L. Reifsnider, Colleyville, TX (US); Md Rassel Raihan, Arlington, TX (US); Muthu Ram Prabhu Elenchezhian, Arlington, TX (US); Priyanshu Kumar Banerjee, Arlington, TX (US); Chaitanya Dave, Arlington, TX (US); Vamsee Vadlamudi, Arlington, TX (US)

(73) Assignee: Board or Regents, The University of Texas Systems, Austin, TX (US)

( * ) Notice: Subject to any disclaimer, the term of this patent is extended or adjusted under 35 U.S.C. 154(b) by 118 days.

(21) Appl. No.: 15/989,541

(22) Filed: May 25, 2018

(65) Prior Publication Data
US 2018/0340900 A1    Nov. 29, 2018

Related U.S. Application Data

(60) Provisional application No. 62/511,319, filed on May 25, 2017.

(51) Int. Cl.
*G01R 27/26* (2006.01)
*G01N 27/02* (2006.01)
*G01N 27/22* (2006.01)

(52) U.S. Cl.
CPC ......... *G01N 27/026* (2013.01); *G01N 27/221* (2013.01)

(58) Field of Classification Search
CPC .... G01N 27/026; G01N 27/221; G01R 27/26; G01R 27/2617
See application file for complete search history.

(56) References Cited

U.S. PATENT DOCUMENTS

2014/0327433 A1\* 11/2014 Anway ............... B29C 65/5021
324/239

OTHER PUBLICATIONS

Raihan, "Dielectric Properties of Composite Materials During Damage Accumulation and Fracture", 2014 (Year: 2014).\*
Durrschmidt et al., "Terahertz Testing of Adhesive Bonds", 2011, IEEE (Year: 2011).\*
Polizos et al., "Dielectric Spectroscopy of Polymer-Based Nanocomposite Dielectrics with Tailored Interfaces and Structured Spatial Distribution of Fillers", 2013, Nanaoscale Spectroscopy with applications, chapter 3 (Year: 2013).\*
Abbas et al., "Phonocardiography Signal Processing Synthesis Lectures on Biomedical Engineering", Morgan & Claypool Publishers 2009, 2 pages.

(Continued)

*Primary Examiner* — Tung X Nguyen
*Assistant Examiner* — Feba Pothen
(74) *Attorney, Agent, or Firm* — Thomas|Horstemeyer, LLP (57) ABSTRACT

In one embodiment, assessing the quality of an adhesive bond of a composite material includes passing a vector electric field through a thickness of the composite material, measuring dielectric properties of the composite material, determining one or more dielectric parameters of the composite material, and comparing the one or more dielectric parameters with one or more reference dielectric parameters.

18 Claims, 5 Drawing Sheets

(56) References Cited

OTHER PUBLICATIONS

Sa-ngasoongsong et al., "Wireless Transmission of Sensor Signals for Phonocardiology Applications", IEEE Sensors 2010 Conference, pp. 1975-1978.
Baker et al., "Meso-design of heterogeneous dielectric material systems: Structure property relationships", Journal of Advanced Dielectrics 2014, vol. 4, No. 2, pp. 1-9.
Banerjee et al., "Predicting Adhesive Bond Performance based on Initial Dielectric Properties", Paper No. 32, 11 pages.
Clifford et al., "Effects of Interfacial Defects on Properties of Laminated Composite Materials and Their Bonded Joints", American Society for composites: Thirty-First Technical Conference, http://dpi-proceedings.com/index.php/asc31/article/view/3249, 2 pages.
Debbal et al., "Computerized heart sounds analysis", Computers in Biology and Medicine 2008, 38, pp. 263-280.
Elenchezhian et al., "Quality Assessment of Adhesive Bond Based on Dielectric Properties", University of Texas at Arlington TX, 14 pages.
Fazzino et al., "Impedance spectroscopy for progressive damage analysis in woven composites", Composites Science and Technology 2009, 69, pp. 2008-2014.
Haldren et al., "Nondestructive Evaluation of Adhesive Bonds via Ultrasonic Phase Measurements", Paper No. 2909, 15 pages.
Fei et al., "Non Destructive Inspection of Weak Bonds in Adhesively Bonded Joints", School of Aerospace and Mechanical Engineering, University College University of New South Wales, Australia, 8 pages.
Moore et al., "Non-Destructive Inspection of Adhesive Bonds in Metal-Metal Joints", Sandia National Laboratories 2009, 22 pages.
Bode et al., "Literature Review of Weak Adhesive Bond Fabrication and Nondestructive Inspection for Strength Measurement", U.S. Department of Transportation Federal Aviation Administration, Aug. 2015, 93 pages.
Raihan et al., "Dielectric signatures and interpretive analysis for changes of state in composite materials", Zamm - Z. Angew. Math. Mech. 2015, 95, No. 10, pp. 1037-1045.
Raihan et al., "Relationship of dielectric property change to composite material state degradation", Composites Science and Technology 2014, 105, pp. 160-165.
Raihan et al., "Performance and Strength Prediction of Composite Materials Based on Dielectric Property Investigation", Society for the Advancement of Material and Process Engineering 2016, 11 pages.
Reifsnider et al., "Material State Changes As a Basis for Prognosis in Aeronautical Structures", Department of Mechanical Engineering University of South Carolina, SC, pp. 1-22.
Shi et al., "Wireless Stethoscope for Recording Heart and Lung Sound", IEEE Biomedical Wireless Technologies, Networks & Sensing systems, 2016, pp. 1-3.
Shi et al., "A Wireless Stethoscope", IEEE MTT-S International Microwave Workshop Series on RF and Wireless Technologies for Biomedical and Healthcare Applications (IMWS-BIO) 2015, pp. 1-2.
Howard B. Sprague, "History and Present Status of Phonocardiography", IRE Transactions on Medical Electronics Dec. 1957, pp. 2-3.
Reifsnider et al., "Method for Weak Bond Detection and Prognosis", University of Texas Arlington 2017, 5 pages.
Wang et al., "Novel Noninvasive Approach for Detecting Arteriovenous Fistula Stenosis", IEEE Transactions on Biomedical Engineering Jun. 2014, vol. 61, No. 6, pp. 1851-1857.

\* cited by examiner

SYSTEMS AND METHODS FOR ASSESSING THE QUALITY OF ADHESIVE BONDS

CROSS-REFERENCE TO RELATED APPLICATION

This application claims priority to U.S. Provisional Application Ser. No. 62/511,319, filed May 25, 2017, which is hereby incorporated by reference herein in its entirety.

BACKGROUND

Composite materials comprising discrete components (e.g., layers of material) are widely used in aerospace, marine, and automotive structures to reduce weight and increase performance. Adhesive bonding improves the stress distribution between the discrete components and ensures a lighter structure than materials joined by conventional fastener. Despite how common such composite materials are, there has not been much research directed toward the non-destructive strength estimation and life prediction, or the damage prognosis of the adhesive bond. One of the main problems when using adhesive bonding is the occurrence of a "kissing bond," which is a weak adhesion bond, alternatively called zero-volume dis-bond, which reduces the strength and/or longevity of the composite material. Unfortunately, conventional non-destructive methods cannot detect such kissing bonds. In view of this, it can be appreciated that it would be desirable to have an improved system and method for assessing the quality of adhesive bonds.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have an improved system and method for assessing the quality of adhesive bonds. Disclosed herein are example embodiments of such a system and method. In some embodiments, a system is used to apply a vector electric field through the thickness of a sample composite material and discrete dielectric parameters of the composite material as a function of the frequency of the electric field are determined. In some embodiments, the dielectric parameters include one or more of permittivity, electric modulus, and dielectric relaxation strength. One of more of these dielectric parameters can be compared with reference dielectric parameters for a given composite material and, through such comparison, the quality of the adhesive bond of the composite material can be assessed. This quality provides an indication of the strength of the adhesive bond as well as the likely useful life of the composite material.

In the following disclosure, various specific embodiments are described. It is to be understood that those embodiments are example implementations of the disclosed inventions and that alternative embodiments are possible. All such embodiments are intended to fall within the scope of this disclosure.

Composite materials are heterogeneous material systems that are generally made up of multiple phases, such as discrete layers of material, which are bonded together. Because they are lightweight and deliver other desirable properties, such as corrosion resistance and wear resistance, as compared to metals, ceramics, or other materials, composite materials are widely used in a variety of different sectors, especially the aerospace industry. The aerospace industry certification approach follows a strict fail-safe philosophy that sometimes restricts the use of many technological breakthroughs. To prevent or delay different failure modes at the bond interface, the current practice in joining the layers of composite materials with fasteners is to thicken the fastener areas and to use numerous fasteners distributed over several lines. This, however, increases the weight and cost of the material and reduces the benefit of composites in aero-structures.

Adhesive bonding is a promising method to reduce structural weight and cost. Drilling of holes for fasteners introduces detrimental stress concentrations and cuts fibers. By using adhesive bonds, these negative impacts of fasteners can be avoided. The use of adhesives for filling the gaps in flanges of an automobile to avoid corrosion is an example of their scope in the automotive industry. Unfortunately, the lack of developments on the durability of adhesively bonded joints and non-destructive evaluation of the strength, life, and performance of adhesive bonds are barriers that prevent industries from greater implementation of adhesive bonding.

The bond-line thickness of an adhesive bond is an important factor in determining the mechanical properties as well as the electrical properties of an adhesive joint. Other factors are the rate of spread or thickness of film, number of coats that must be applied, and the conditions of drying where more than one coat is required. For the testing and characterization of adhesive bonds in composite materials, certain standards must be followed to ensure that the samples are not altered during the testing and characterization process. These standards are based on the geometry of the sample, its surface roughness and the time required for curing.

Weak adhesive bonds usually occur if any of the aforementioned factors of the adhesive or the adherent are changed with respect to the standards. The "kissing bond," which is a weak interfacial bond between the two adherent surfaces, is a type of weak adhesion bond. It is caused by the two adherent surfaces coming into contact in a process that causes a weak bonding between the adherent and adhesive and reduces the strength of the bond, often significantly. One of the major difficulties faced in this type of defective bonding is detection of the defective bond. There are very few non-destructive testing (NDT) methods that are capable of identifying weak adhesive bonding, especially a kissing bond in which the surfaces are in contact but not mechanically bonded.

Broadband dielectric spectroscopy (BbDS) is a method that can be used to characterize dielectric materials. BbDS analyzes dielectric spectra, which show the interaction of electromagnetic waves within the material. Generally speaking, an electromagnetic wave is applied to a material at various frequencies and measurements are made of the dielectric spectral response. The range of frequency used to obtain the dielectric properties of the material typically lies between approximately $10^{-6}$ Hz to $10^{12}$ Hz. This range produces data associated with molecular and combined dipolar fluctuation, charge transport, and effects of polarization arising within the boundaries of the material under study. Maxwell's equations thoroughly depict the interaction between electromagnetic fields and matter. A material system is comprised of multiple polarization mechanisms such as ionic (molecular), dipolar (orientational), electronic, interfacial (Maxwell-Wagner-Sillars), and hopping charge polarization.

A fiber-reinforced composite material, such as carbon-fiber reinforced polymer, is made of discrete phases of different materials that have varying electrical properties. During the manufacturing of a composite material, these different materials are brought in contact with each other, which leads to a buildup of charge in the presence of a vector electric field at material interfaces known as polarization. As the manufacturing process advances, the interface goes through many variations that are caused due to the changes in the environment and material deterioration. These surfaces store charge at the interfaces and defects. Interfacial polarization occurs in this case, which causes dielectric relaxation, thus providing details about the structure of these heterogeneous materials and its electrical properties. A number of factors are responsible for the occurrence of these dielectric relaxations, such as its orientation relative to the direction of the vector in the applied electric field and the shape of the heterogeneous inclusions, as well as the number of different interfaces. But, it is difficult to predict all of the dielectric relaxations due to limitations in the range of frequencies and the vulnerability during measurements.

There are several events that lead to the deterioration of fiber-reinforced composite materials, such as fiber fracture, growth, and development of microcracks in the matrix, delamination, decoupling of the fiber-matrix interface, micro-buckling, etc. BbDS can be used to detect the modes of damage in the heterogeneous composite systems reflected in the variation of dielectric spectra, and to identify strength of the composite system in individual specimens or samples. The weak adhesion bond often occurs in an adhesively bonded composite system due to the pre-contamination of the adherent surface, and it takes place at the interface of the adherent and the adhesive. Due to the change in the material properties in such an interfacial region, the dielectric response will be dissimilar for adhesive bonds with different surface treatments. It is an element of the present disclosure objective to identify the integrity of composite material systems that are bonded by an adhesive with different surface treatments of the adherent, based on the dielectric properties of the adhesively bonded composite system. It is also an objective to identify the best representations of dielectric properties (i.e., particular dielectric parameters) for assessing the integrity of an adhesive bond.

Experiments were performed to evaluate the use of BbDS in assessing the quality of bonds within composite materials. In particular, BbDS was performed on various fiber-reinforced composite materials and specific dielectric parameters were determined to investigate the relationship between the bond-line preparation in the composite material and changes in the bulk dielectric response, which reflect the internal defect state of the material system, including the strength or weakness of an adhesion bond within the composite material.

Composite material specimens were fabricated for the experiments. First, a carbon-fiber laminate was fabricated using layers of carbon fiber fabric that were pre-impregnated with plastic resin (i.e., "prepreg fabric") from Torayca T700S/G94 (supplied by Rockwest Composites). Four plies of the prepreg fabric, with an orientation of $[0]_{4s}$, were layered on top of each other to form a 25.4 cm×25.4 cm laminate. The plies were then bonded together to form the laminate by using a compression molding process and applying the manufacturer's supplied curing cycle. The thickness of the laminate was 0.91 mm. The laminate was then cut into square pieces that were 25.4 mm×25.4 mm.

Next, pairs of square pieces were bonded together with adhesive for the purpose of creating composite material specimens that could be evaluated. The adhesive used in the bonding was Henkel Hysol EA9394, which is a two-part aerospace grade adhesive. 50 grams of Part A was mixed with 7 grams of Part B under a fume hood, as per the manufacturer's specifications. Glass microspheres were added to the adhesive prior to its application to increase and maintain the bond-line thickness (0.762 mm).

Six different types of specimens were prepared to simulate weak adhesion bonds and study interfacial polarization among them. The various specimens, i.e., Specimens A-F, had the following characteristics:

Specimen A: The two surfaces of the two pieces to be joined were sanded according to ASTM D 2093 prior to bonding.

Specimen B: Only one surface of one piece to be joined was sanded prior to bonding.

Specimen C: Neither surface of each piece to be joined was sanded prior to bonding.

Specimen D: A water droplet was placed on one of the surfaces to be joined prior to bonding.

Specimen E: Both pieces were immersed in water prior to bonding.

Specimen F: A droplet of oil was placed on one of the surfaces to be joined prior to bonding.

Figure 1:
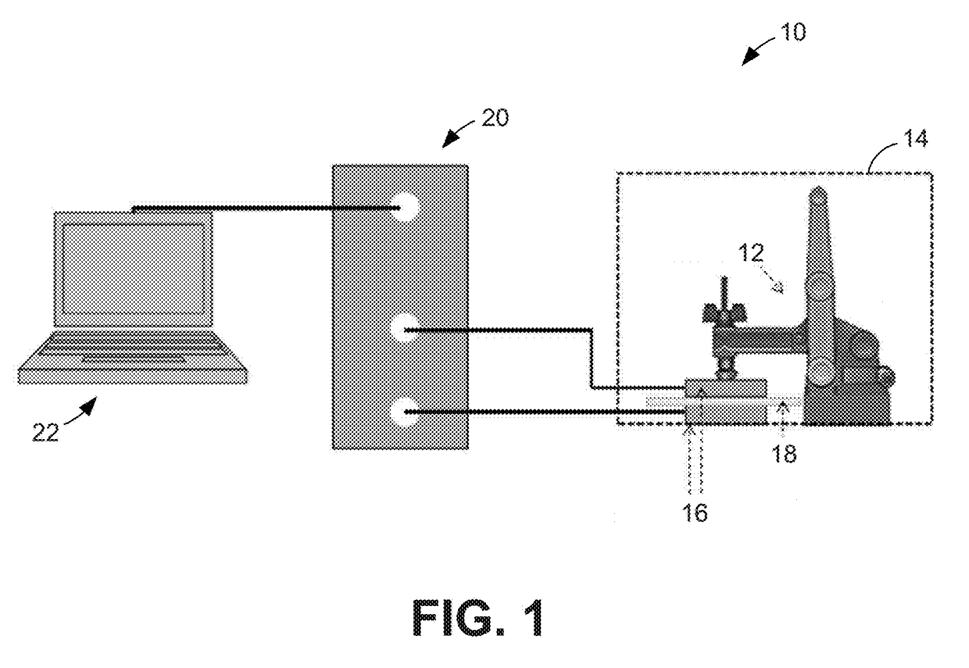
FIG. 1 is a schematic diagram of an embodiment of a system for assessing the quality of adhesive bonds.

Once the specimens were created, their dielectric properties were measured using the system 10 similar to that depicted in FIG. 1. As shown in this figure, the system 10 comprises a sample holder 12 provided within a Faraday cage 14 that shields the holder from external electromagnetic fields. The sample holder 12 includes two opposed conductive contact plates 16 between which a specimen 18 can be placed. A voltage source (not shown) provides an electrical potential to the plates 16 so as to generate a vector electric field of varying frequency that passes through the thickness of the specimen 18. The dielectric properties of the composite material, including the permittivities of the material as a function of the frequency of the applied electric field, are measured by a spectrometer 20 (e.g., a Novocontrol Broadband Dielectric Spectrometer). The spectrometer 20 outputs measurement data to a computing device 22 for analysis described below.

Three dielectric parameters were considered in evaluating each specimen: permittivity, electric modulus, and dielectric relaxation strength. Each of these parameters is discussed below.

Permittivity

Dielectric materials contain polar molecules and may have interfaces with different electrical properties. An applied electric field will polarize the composite material by orienting the dipole moments of polar molecules and charge accumulation at the interfaces at dissimilar materials. The polarization of a linear dielectric is given as:

$$P = \varepsilon_0 \chi E \quad [1]$$

where $\chi$=tensor of dielectric susceptibility, $\varepsilon_0$=dielectric permittivity of vacuum (i.e., 8.854×10e-12 F/m), and E=electric field. Based on Maxwell's laws of electromagnetism, the following equation results:

$$\nabla \cdot D = \rho \quad [2]$$

This is also known as Gauss's Law, where, $\nabla$=divergence operator, D=electric displacement field, and $\rho$=electric charge volume density.

The relation between the dielectric displacement and electric field is given as $$D = \varepsilon_0 E + P \quad [3]$$

From Equation [1], $$D = \varepsilon_0 E + \varepsilon_0 \chi E \quad [4]$$

$$D = \varepsilon_0 \varepsilon_r E \quad [5]$$

Figure 2A:
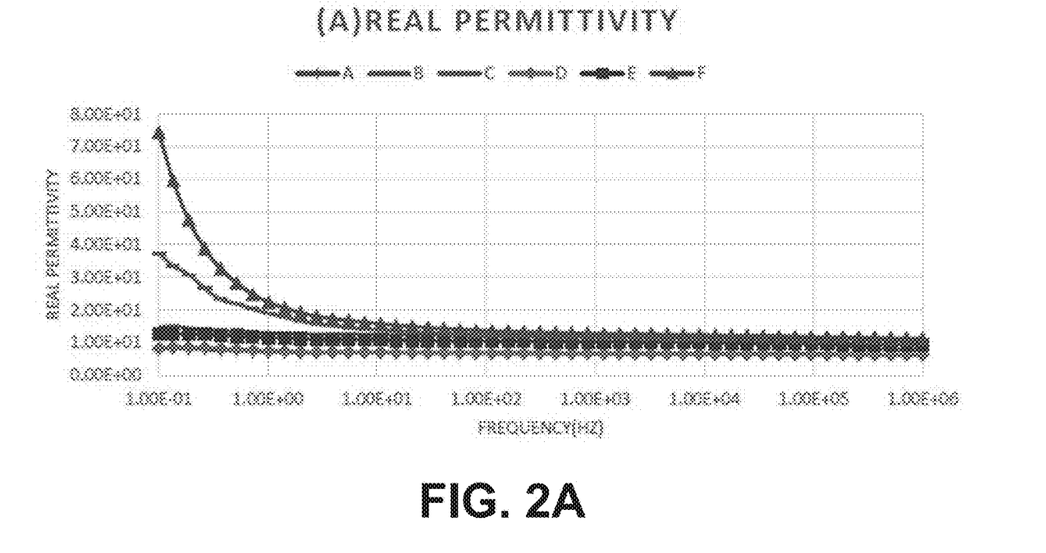
FIG. 2A is a graph showing an example of the real permittivity for various composite material specimens.
Figure 2B:
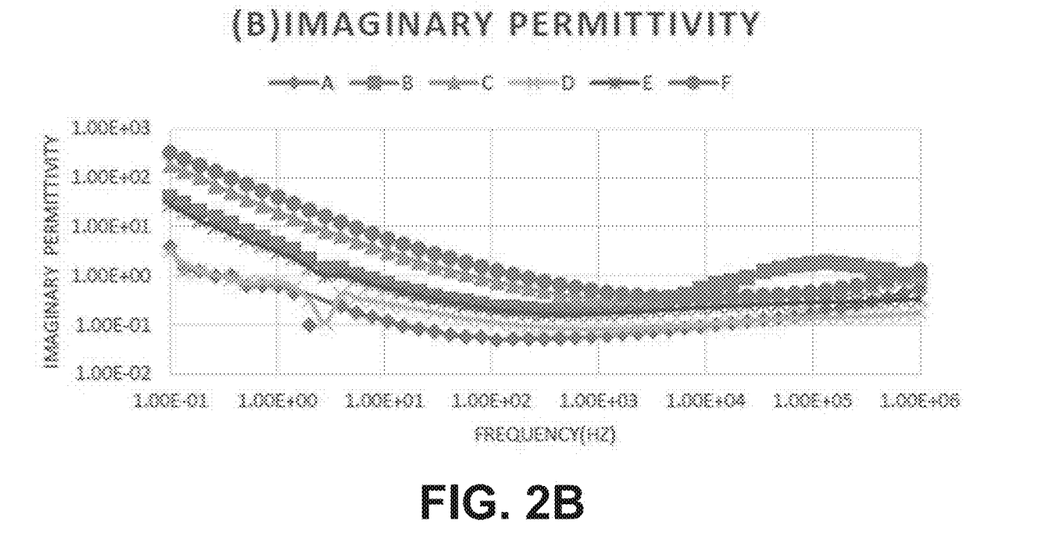
FIG. 2B is a graph showing an example of the imaginary permittivity for various composite material specimens.

In this case, $\varepsilon_r = (1+\chi)$ is known as relative permittivity. Finally, $D = \varepsilon E$ where $E = \varepsilon_0 \varepsilon_r = \varepsilon' - \varepsilon''$ is defined as complex permittivity in which $\varepsilon'$ is the real part of the complex permittivity and $\varepsilon''$ is the imaginary part, in other words the dielectric loss. Thus, one can plot two graphs, one for the real part of the permittivity and other for the imaginary part, both of which correspond to the logarithmic values of the frequencies. Such graphs are shown for specimens A-F in FIGS. 2A and 2B, respectively. As can be appreciated from these graphs, Specimen A had a lower permittivity than Specimen F. This means that the adhesive bond of Specimen A had greater integrity than the adhesive bond of Specimen F. Other variations between the specimens are apparent from FIGS. 2A and 2B.

Electric Modulus

Figure 3A:
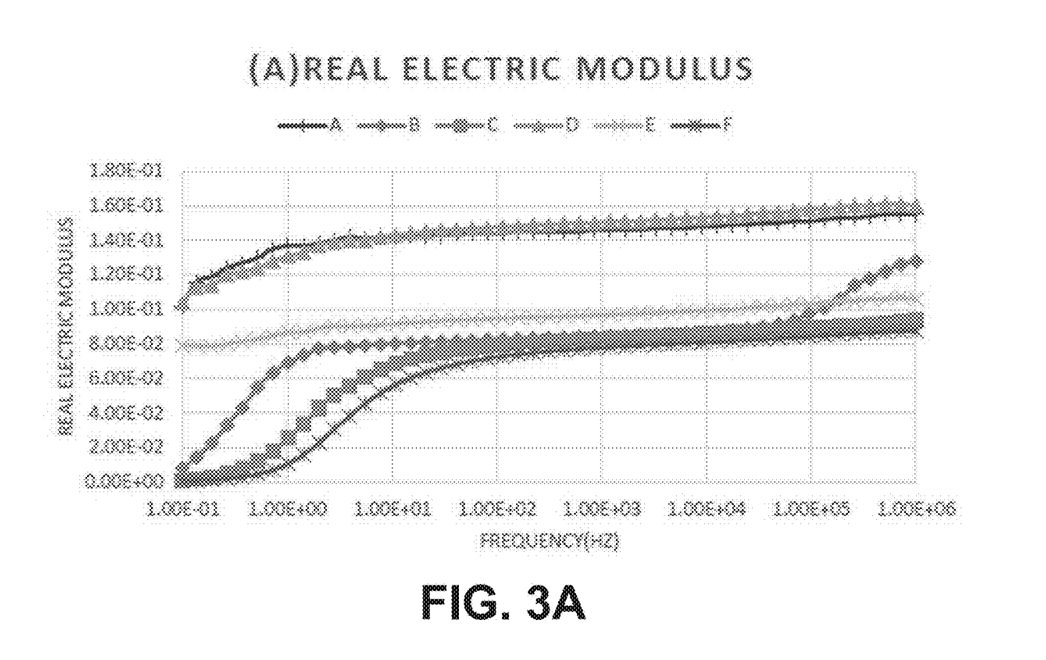
FIG. 3A is a graph of the real electric modulus for several the composite material specimens.
Figure 3B:
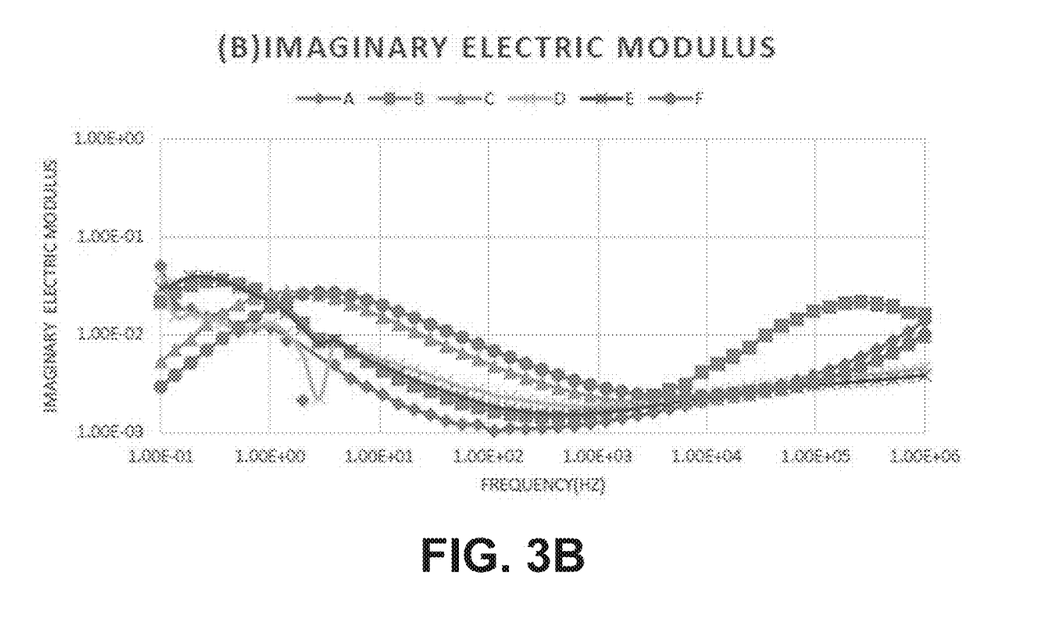
FIG. 3B is a graph of the imaginary electric modulus for several composite material specimens.

The electric modulus reduces the variations that occur in the large values of permittivity and conductivity at lower frequencies. Electric modulus is defined as the inverse of dielectric permittivity. Hence, the real and imaginary parts of the electric modulus can also be plotted with respect to the frequencies in the way the permittivities were plotted. FIGS. 3A and 3B are plots of the electric modulus for Specimens A-F. FIG. 3A shows that the real electric modulus was highest for Specimen A and lowest for Specimen F. This means that Specimen A had less interfacial polarization, indicating less defects and greater integrity than Specimen F, which had greater interfacial polarization, indicating the presence of more defects. From FIGS. 3A and 3B, one can deduce that the ranking of the specimens from least defective to most defective was A, D, E, B, C, F.

Dielectric Relaxation Strength

Dielectric relaxation strength, in simple terms, can be defined as the algebraic difference between the static permittivity value and the limiting high frequency permittivity, as given in Equation 6:

$$\Delta \varepsilon = \varepsilon_s - \varepsilon_\infty \quad [6]$$

Figure 4:
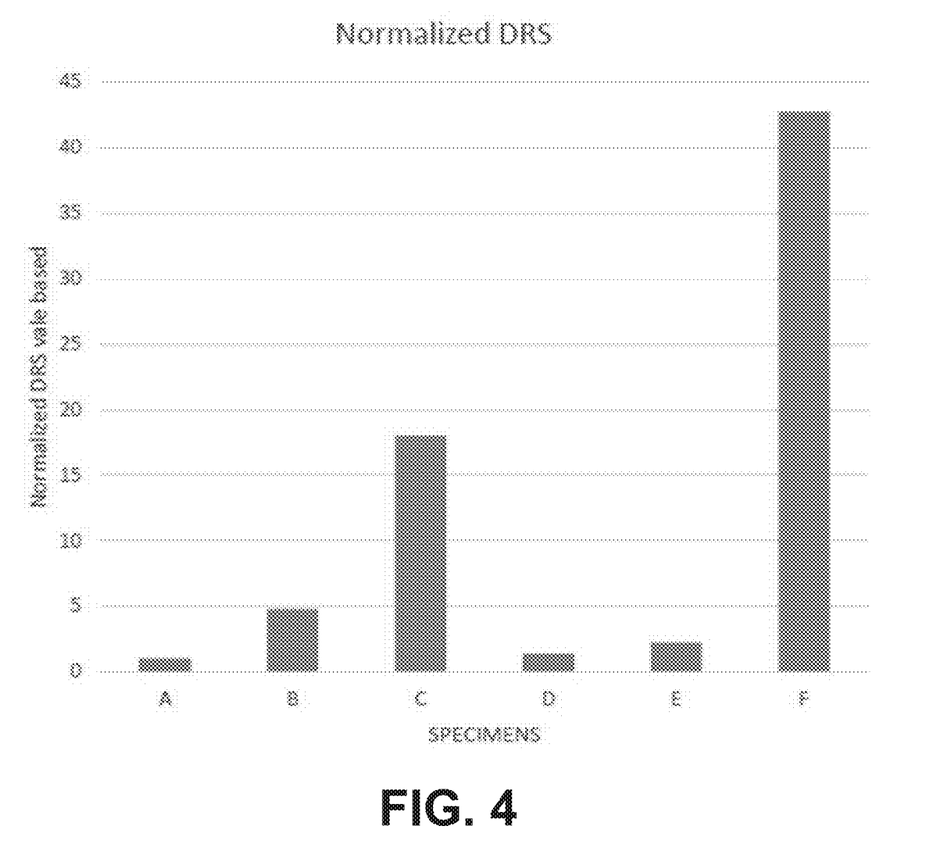
FIG. 4 is a graph that illustrates the normalized dielectric relaxation strength (DRS) for the composite material specimens.

The dielectric relaxation strength is helpful in determining the interfacial polarization as given by the relation that states that the interfacial polarization in a particular heterogeneous composite material is higher if its dielectric relaxation strength value higher. This further proves the fact that, the greater the defects in a system, the higher the dielectric relaxation strength value. FIG. 4 shows the dielectric relaxation strength values of all the tested specimens.

From FIG. 4, it can be appreciated that the normalized dielectric relaxation strength was is least for Specimen A and the highest for the Specimen F, proving the theory discussed above. Comparatively, Specimen F, which contained an oil droplet, had 40 times the dielectric relaxation strength of Sample A, a good sample that was sanded on both sides of the bond. The specimens that were sanded on both sides, contained a water droplet, or were immersed in water had lower dielectric relaxation strength values compared to the unsanded and one-sided sanded specimens. From the normalized dielectric relaxation strength, one can also rank the specimens from least defective to most defective in the following order: A, D, E, B, C, F. This order directly corresponds with the order obtained from electric modulus analysis above.

From the above experiments, it can be appreciated that weak adhesion bonding can result from the pre-contamination of the adherent sample surfaces. To simulate the weak adhesion bond (a "kissing bond"), adherent surfaces were treated differently and the dielectric properties were measured to rank the specimen integrity based on the determined dielectric parameters. Weak adhesion bonding occurs in the interfacial region of the adherent and adhesive primarily because of the impurities and surface conditions, which lead to greater interfacial polarization during electrical excitation. This type of polarization can be observed in the lower frequency range of the dielectric spectrum. It was determined that BbDS can be used to predict future properties and performance of individual adhesively bonded composite material samples. Based on the permittivity, electric modulus, and the dielectric relaxation strength data obtained from the BbDS experimental tests, it was determined that in the lower frequency region there were significant differences between Specimen A, which was made by following the ASTM D 2093 standard, and other samples, whose adherent surfaces were intentionally contaminated. These increases in measured values are reflected in the interfacial polarization that occurred because of the impurities that were introduced.

From the above-described experimentation, it was also determined that the electric modulus and dielectric relaxation strength parameters gave more accurate interpretations of the materials' state of the adhesive bonds than did other types of analysis. Significantly, it was demonstrated that some of the BbDS parameters are predictors of the quality for individual bonded specimens. Furthermore, the dielectric parameters of fiber-reinforced composite materials can be used to predict the final performance of the composite material system. By using the dielectric parameters disclosed herein, it may be possible to directly estimate mechanical strength and behavior from dielectric measurements, for specific adhesive bonded joints and samples. In this manner, one can sort bonds as "good" bonds or "bad" bonds, as well as rank the order and proportion of strength, life, and performance of a given random sample of specimens, before the failure of the adhesive bonds and the failure of the structures in which they are used. The promise of this method is significant, and greatly needed for "current state analysis" and predictive prognosis in adhesive bonds.

The systems and methods described herein measure the integrity, and therefore strength, of an adhesive bond of a bonded composite material. Thus, the collected dielectric information enables a user to assess the quality of an adhesive bond as opposed to simply determining whether or not the composite material is defective or acceptable. As the systems and methods assess the strength of a bond by providing quantifiable measurements, one can also estimate the useful life of a composite material and the risk of material fatigue. By quantifying the quality of an adhesive bond during the manufacturing process, the strength and useful life of a composite material can be predicted. This, in turn, provides information about the potential for material failure.

Figure 5:
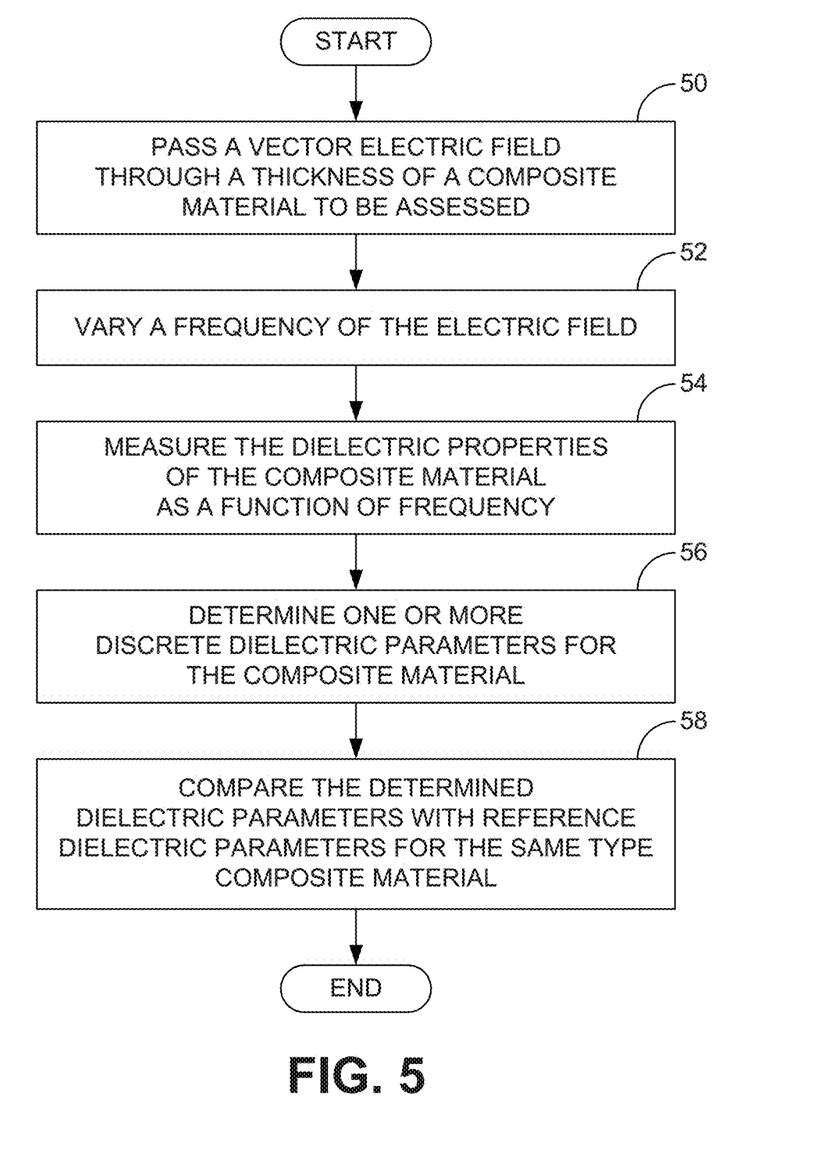
FIG. 5 is a flow diagram of an embodiment of a method for assessing the quality of adhesive bonds.

FIG. 5 is a flow diagram of an embodiment of a method of assessing the quality of adhesive bonds in accordance with the above disclosure. Beginning with block 50 a vector electric field is passed through a thickness of a composite material to be assessed. Notably, the electric field passes through the composite material, as opposed to traveling along the material's surface as in a conduction scenario. As indicated above, this can be achieved using a system similar to that shown in FIG. 1. As noted in block 52, a frequency of the electric field can varied as it is applied to the composite material.

Referring next to block 54, the dielectric properties of the composite material are measured as a function of frequency. As indicated above, the dielectric properties can, for example, comprise the permittivities of the composite material as a function of frequency, which can be measured using a spectrometer. Once the dielectric properties have been measured, one or more discrete dielectric parameters for the composite material can be determined, as indicated in block 56. As indicated above, these dielectric parameters can comprise one or more of the real and imaginary parts of permittivity, the real and imaginary parts of electric modulus, and the dielectric relaxation strength.

Once the dielectric parameters have been determined, they can be compared to reference dielectric parameters for the same type of composite material, as identified in block 58. In some embodiments, the reference dielectric parameters include one or more of the real and imaginary parts of permittivity, the real and imaginary parts of electric modulus, and dielectric relaxation strength for a similar composite material that is known to have one or more high integrity adhesive bonds (i.e., a "good" example). Through this comparison, one can determine the quality of the adhesive bonds of the composite material being assessed. As indicated above, higher dielectric parameter values that are indicative of a lower quality adhesive bonds. Therefore, if the determined dielectric parameters exceed the reference dielectric parameters, the adhesive bond of the composite material being assessed is substandard. Notably, one can estimate the strength of the adhesive bond through the comparison. Instead of obtaining a binary "good" or "bad" determination, the strength determination is quantitative. For instance, through comparison with the dielectric parameters for the good example, one may determine that the strength of the adhesive bond of the composite material being assessed is some percentage of the strength of the adhesive bond of the good example. From this strength determination, the longevity of the composite material being assessed can be estimated.

In some embodiments, an executable computer program, for example resident on a computer-readable medium of the computing device 22 (FIG. 1), can be used in the assessment process. Such a program (i.e., a collection of computer-executable instructions that may comprise part of one or more computer algorithms) can be used to determine the various dielectric parameters as well as compare the parameters to stored reference dielectric parameters to automate the assessment process. In some embodiments, the computer program can further provide an estimate of the strength of the adhesive bonds of the composite material being assessed.

The invention claimed is:

1. A method for assessing quality of an adhesive bond of a composite material, the method comprising:
    passing a vector electric field through a thickness of the composite material;
    measuring dielectric properties of the composite material;
    determining one or more dielectric parameters of the composite material;
    comparing the one or more dielectric parameters with one or more reference dielectric parameters; and
    determining the quality of the adhesive bond based upon the comparison.

2. The method of claim 1, further comprising varying a frequency of the vector electric field as it is passed through the thickness of the composite material.

3. The method of claim 1, wherein measuring dielectric properties comprises measuring permittivities of the composite material.

4. The method of claim 3, wherein the permittivities are measured using a spectrometer.

5. The method of claim 3, wherein determining one or more dielectric parameters comprises determining one or more of real and imaginary parts of permittivity, real and imaginary parts of electric modulus, and dielectric relaxation strength.

6. The method of claim 3, wherein determining one or more dielectric parameters comprises determining one or more of real and imaginary parts of permittivity of the composite material.

7. The method of claim 3, wherein determining one or more dielectric parameters comprises determining one or more of real and imaginary parts of electric modulus of the composite material.

8. The method of claim 3, wherein determining one or more dielectric parameters comprises determining dielectric relaxation strength of the composite material.

9. The method of claim 1, wherein determining the quality of the adhesive bond comprises determining a strength of the adhesive bond.

10. A system for assessing quality of an adhesive bond of a composite material, the system comprising:
    means for passing a vector electric field through a thickness of the composite material;
    means for measuring dielectric properties of the composite material;
    a computing device configured to receive the measured dielectric properties, determine one or more dielectric parameters of the composite material, compare the one or more dielectric parameters with one or more reference dielectric parameters, and determine the quality of the adhesive bond based upon the comparison.

11. The system of claim 10, wherein the means for passing the vector electric field through the thickness of the composite material are configured to vary a frequency of the electric field.

12. The system of claim 10, wherein the means for measuring dielectric properties are configured to measure permittivities of the composite material.

13. The system of claim 12, wherein the means for measuring dielectric properties comprise a spectrometer.

14. The system of claim 10, wherein the computing device is configured to determine one or more of real and imaginary parts of permittivity, real and imaginary parts of electric modulus, and dielectric relaxation strength of the composite material.

15. The system of claim 10, wherein the computing device is configured to determine one or more of real and imaginary parts of permittivity of the composite material.

16. The system of claim 10, wherein the computing device is configured to determine one or more of real and imaginary parts of electric modulus of the composite material.

17. The system of claim 10, wherein the computing device is configured to determine dielectric relaxation strength of the composite material.

18. The system of claim 10, wherein the computing device is further configured to determine a strength of the adhesive bond of the composite material.

* * * * *